(12) United States Patent
Nason et al.

(10) Patent No.: US 7,328,271 B2
(45) Date of Patent: Feb. 5, 2008

(54) METHOD OF CONTROLLING TELEPHONE CONNECTIONS FOR INTERNET PROTOCOL COMMUNICATIONS

(75) Inventors: Christopher James Nason, Kanata (CA); Craig Frisch, Montreal (CA); Andre Moskal, Kanata (CA)

(73) Assignee: Mitel Networks Corporation, Kanata, Ontario (CA)

( * ) Notice: Subject to any disclaimer, the term of this patent is extended or adjusted under 35 U.S.C. 154(b) by 997 days.

(21) Appl. No.: 09/800,112

(22) Filed: Mar. 5, 2001

(65) Prior Publication Data

US 2002/0174240 A1    Nov. 21, 2002

(51) Int. Cl.
*G06F 15/16* (2006.01)
(52) U.S. Cl. ...................................... 709/230
(58) Field of Classification Search ................ 709/230; 370/352
See application file for complete search history.

(56) References Cited

U.S. PATENT DOCUMENTS

| | | | |
|---|---|---|---|
| 6,359,880 B1 * | 3/2002 | Curry et al. ................ 370/352 |
| 6,363,065 B1 * | 3/2002 | Thornton et al. ........... 370/352 |
| 6,539,077 B1 * | 3/2003 | Ranalli et al. ............. 379/67.1 |
| 6,542,497 B1 * | 4/2003 | Curry et al. ................ 370/352 |
| 6,654,455 B1 * | 11/2003 | Isaka ..................... 379/202.01 |
| 6,721,306 B1 * | 4/2004 | Farris et al. ................ 370/352 |
| 6,801,540 B1 * | 10/2004 | Jeong ....................... 370/466 |
| 2001/0026545 A1 * | 10/2001 | Matsumoto et al. ........ 370/338 |

* cited by examiner

*Primary Examiner*—Jason Cardone
*Assistant Examiner*—Thomas Duong
(74) *Attorney, Agent, or Firm*—William J. Sapone; Coleman Sudol Sappone P.C.

(57) ABSTRACT

A method of controlling telephone connections for internet protocol communications provides a structure for encapsulating a message to be exchanged between an IP phone and an entity within an Ethernet-based PBX, comprising utilizing a Protocol Header and an IP Message body, wherein the Protocol Header includes an indication of Protocol Type for denoting whether the message is an IP message or an encapsulated non-IP message, Device Number for denoting, by means of a MAC (Media Access Control), an address for the entity within the PBX to which the message is to be transmitted or from which the message is to be received, and Message Type for identifying the type of message contained in the IP Message Body.

20 Claims, 2 Drawing Sheets

METHOD OF CONTROLLING TELEPHONE CONNECTIONS FOR INTERNET PROTOCOL COMMUNICATIONS

FIELD OF THE INVENTION

The present invention relates generally to Internet Protocol (IP) telephony, and more particularly to a method of controlling IP telephones within a LAN-implemented or Ethernet PBX using a specialized messaging protocol.

BACKGROUND OF THE INVENTION

With the increasing pervasiveness of the Internet, Voice-over-IP (VoIP) is rapidly displacing traditional TDM (Time Division Multiplexing) voice communications. In order to establish communications with Ethernet PBXs, an IP transport control messaging protocol is required to be established between the phone and PBX system.

SUMMARY OF THE INVENTION

According to the present invention, a method of controlling telephone connections for internet protocol communications comprises providing a byte oriented and easily adaptable messaging protocol for wrapping communications between IP telephones and Ethernet voice-LAN systems. The messages are required to implement essential tasks such as IP phone registration with the system upon phone power up or reset, the application of device tones to IP phones, and connection control for establishing full-duplex voice paths between IP phones. The messaging protocol of the invention also supports additional administrative and telephony functions.

The messaging protocol for wrapping the messages utilizes a general message template having a Protocol Header and an IP Message body. The Protocol Header, in turn, includes an indication of the Protocol Type, Device Number and Message Type. The Device Number identifies the entity sharing the same MAC (Media Access Control) address that the messages are destined to or coming from. Message Type identifies the type of message contained in the IP Message Body. The Protocol Type denotes whether the message is an IP message (e.g. Mitel proprietary Minet IP message) or an encapsulated non-IP message (e.g. Mitel proprietary Minet (MTS 22) message). The Minet (MTS 22) messaging protocol is implemented in Mitel PBX models SX50, SX200, SX2000, IPERA 2000 for communicating with associated telephones such as Mitel models SS4001, SS4015, SS4025, SS4150, SS4015IP and SS4025IP.

BRIEF DESCRIPTION OF THE DRAWINGS

A preferred embodiment of the present invention will now be described more fully with reference to the accompanying drawings in which.

DETAILED DESCRIPTION OF THE PREFERRED EMBODIMENT

The method of controlling telephone connections for internet protocol communications using the messaging protocol which encapsulate a collection of specific messages of the present invention have particular application to the assignee's legacy mix of assembly and higher level languages. Consequently, reference to Minet and MinetIP messages occur throughout this disclosure to indicate the preferred embodiment and best mode implementation of the invention.

The Minet messaging extensions are structure based and are long word aligned, the result of which is that a user with a packet Sniffer will detect filler bytes in between short and long words.

In order to control a Mitel IP Phone, both Minet and Minet IP messages are required. A common message wrapper is defined to house the messages. The general message template consist of a Protocol Header and a Minet IP Message body that may or may not consist of an MTS22 Minet payload "wrapper".

Protocol Header:

| Protocol Header: | | |
|---|---|---|
| ProtoType: | 4 bytes, unsigned long integer, Protocol Type |
| devNum: | 4 bytes, unsigned long integer, Device Number |
| msgType: | 4 bytes, unsigned long integer, Message Type |

The message body follows the Protocol Header as shown in the structure below:

```
typedef struct_IPSP_MSG {
    PROTOCOL_HEADER_MSG hdr;
    union_msg {
        MINET_WRAPPER_MSG              MWM;
        DEVICE_REGISTRATION_MSG        DRM;
        DEVICE_REGISTRATION_ACK_MSG    DRAM;
        DEVICE_UNREGISTER_MSG                DUM;
        DEVICE_UNREGISTER_ACK_MSG      DUAM;
        OPEN_RX_STREAM_REQUEST_MSG     ORSRM;
        OPEN_RX_STREAM_ACK_MSG         ORSAM;
        CLOSE_RX_STREAM_REQUEST_MSG    CRSRM;
        CLOSE_RX_STREAM_ACK_MSG        CRSAM;
        OPEN_TX_STREAM_REQUEST_MSG     OTSRM;
        OPEN_TX_STREAM_ACK_MSG         OTSAM:
        CLOSE_TX_STREAM_REQUEST_MSG    CTSRM;
        CLOSE_TX_STREAM_ACK_MSG        CTSAM;
        APPLY_TONE_REQUEST_MSG         ATRM;
        REMOVE_TONE_REQUEST_MSG        RTRM;
        DEVICE_PING_REQUEST_MSG        DPRM;
        DEVICE_PING_ACK_MSG            DPAM;
        DEVICE_IP_UPDATE_REQUEST_MSG   DIURM;
        DEVICE_IP_UPDATE_ACK_MSG       DIUAM;
    } msg;
} IPSP_MSG;
typedef struct {
    protocolType_t    protoType;
    deviceNumber_t    devNum;
    messageType_t     msgType;
} PROTOCOL_HEADER_MSG:
```

Protocol Type:

| INVALID_PROTOCOL_TYPE | 0x00000000 |
|---|---|
| MINET_MTS22 | 0x00000001 |
| MITEL_INTERNAL | 0x00000002 |

The Protocol Type denotes whether the message is a Minet IP message or an encapsulated Minet (MTS 22) message.

Device Number:

| | |
|---|---|
| Phone | 0x00000000 |
| Device #1 i.e. PKM | 0x00000001 |
| Device #2 | 0x00000002 |
| . . . | . . . |
| Device #n | 0x0000000n |

The Device Number denotes which entity shares the same MAC address with the entity the messages are destined to or coming from.

Message Type:

| | |
|---|---|
| INVALID_MESSAGE_TYPE | 0x00000000 |
| DEVICE_REGISTRATION | 0x00000001 |
| DEVICE_REGISTRATION_ACK | 0x00000002 |
| DEVICE_DEREGISTRATION | 0x00000003 |
| DEVICE_DEREGISTRATION_ACK | 0x00000004 |
| OPEN_RX_STREAM | 0x00000005 |
| OPEN_RX_STREAM_ACK | 0x00000006 |
| CLOSE_RX_STREAM | 0x00000007 |
| CLOSE_RX_STREAM_ACK | 0x00000008 |
| OPEN_TX_STREAM | 0x00000009 |
| OPEN_TX_STREAM_ACK | 0x0000000a |
| CLOSE_TX_STREAM | 0x0000000b |
| CLOSE_TX_STREAM_ACK | 0x0000000c |
| MINET_WRAPPER | 0x0000000d |
| APPLY_TONE | 0x0000000e |
| REMOVE_TONE | 0x0000000f |
| DEVICE_PING | 0x00000010 |
| DEVICE_PING_ACK | 0x00000011 |
| DEVICE_IP_UPDATE | 0x00000012 |
| DEVICE_IP_UPDATE_ACK | 0x00000013 |
| INVALID_MSG_TYPE | 0x00000014 |

The above referenced message protocol is used to wrap or encapsulate each message sent and/or received by the IP phone or PBX. The following are examples of the use of the message protocol in reference to specific messages sent between IP telephones and Ethernet voice-LAN PBX systems. Each example begins by listing the Protocol header, Device Number and Message type.

Minet IP Registration Sequence

Figure 1:
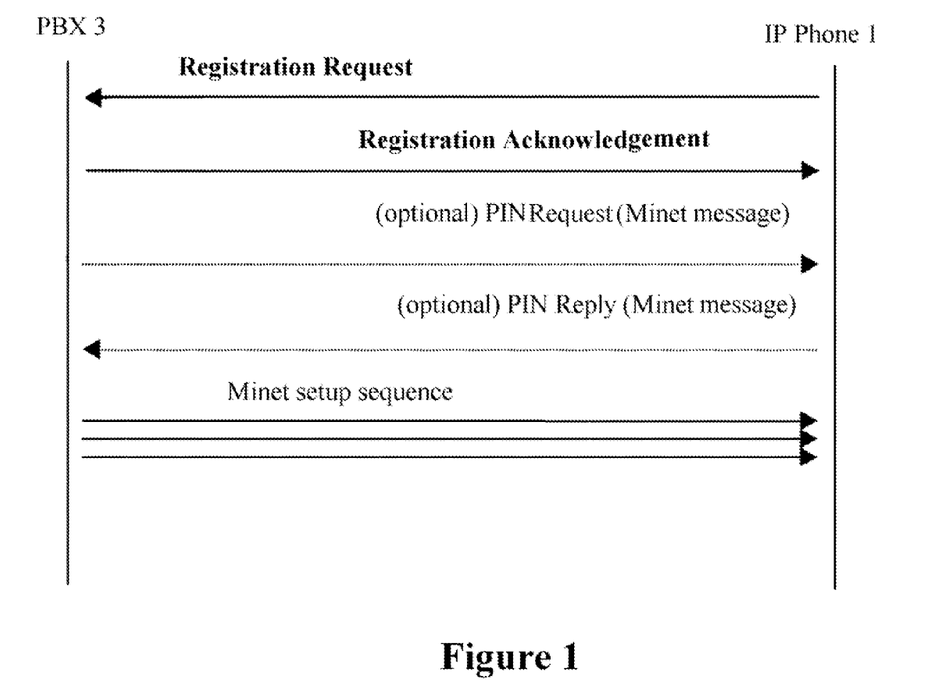
FIG. 1 is a message flow diagram showing registration of an IP phone with an Ethernet PBX.

As shown in FIG. 1, when the IP Phone 1 powers up or resets, it must register with the PBX 3. The phone 1 originates a Registration Request and receives a Registration Acknowledgement in return. The PBX 3 checks the Device ID of the phone (its MAC address) and verifies if it has the Device ID in the CDE database. If not, the system sends the phone 1 an MTS22 Minet for PIN Request. The phone buffers the key entries and sends up one message containing the PIN Reply (also an MTS22 Minet message).

The following messages are generated and exchanged between the IP phone and the PBX to register and de-register the phone 1 with the PBX 3:

Device Registration Request Message Sent from the IP Phone

ProtoType=MITEL_INTERNAL

DevNum=N where N=0, 1, 2, . . . n msgType=DEVICE_REGISTRATION

DEVICE_REGISTRATION_MSG

| | |
|---|---|
| devId: | 6 unsigned byte array |
| mac_addr[6] | MAC address of Phone.<br>Note that due to long word alignment, there may be 2 bytes of filler between the MAC address and the next defined field. |
| devType: | 4 bytes, unsigned long integer, Type of device (i.e., SET, PKM, . . . ) |
| devNumber: | 4 bytes, unsigned long integer, Number of device: Master, Slave01, Slave02, . . . |
| ipAddress: | structure |
| ip_addr | 4 bytes, unsigned long integer, IP Address of device, |
| ip_port | 2 bytes, unsigned short integer, port number of protocol medium.<br>Note that due to long word alignment, there may be two bytes of filler between this field and the next. |
| DeviceCaps: | structure: Functionality supported by this device |
| strmCodec | 4 bytes, unsigned long integer (bitmap), System selected CODEC to use. Multiple CODECs may be logically Ored into this field. |
| numTxStreams: | 4 bytes, unsigned long integer, Number of Tx streams supported by the device |
| numRxStreams: | 4 bytes unsigned long integer, Number of Rx streams supported by the device |
| prefStrmFrameSizeInMS: | 4 bytes, unsigned long integer, Devices preferred frame size for streams (in ms) |
| silenceSupp: | 4 bytes, unsigned long integer:<br>silenceSupp=0: device does not support silence suppression<br>silenceSupp=1: device supports silence suppression |
| toneGeneration: | 4 bytes, unsigned long integer:<br>toneGeneration =0: device does not support local tone generation.<br>toneGeneration =1: device supports local tone generation |

Device Registration Request Acknowledgment Message Sent from System

ProtoType=MITEL_INTERNAL

DevNum=N where N=0, 1, 2, . . . n msgType=DEVICE_REGISTRATION_ACK

DEVICE_REGISTRATION_ACK_MSG

| | |
|---|---|
| reqStatus: | 4 bytes, unsigned long integer, Success/Failure Result of the request |
| sysToken: | 4 bytes, unsigned long integer, System defined "token" that must be passed back with any follow up message related to this message i.e. Device Unregister. |

Device De-Registration Request Message Sent from IP Phone.

ProtoType=MITEL_INTERNAL

DevNum=N where N=0, 1, 2, . . . n msgType=DEVICE_DEREGISTRATION

Note that the IP Phone will not unregister itself, but rather an associated device such as a PKM may be removed and hence deregistered.

DEVICE_UNREGISTER_MSG

| | |
|---|---|
| sysToken: | 4 bytes, unsigned long integer, System defined "token" taken from the Registration Acknowledgment from the system. |
| devType: | 4 bytes, unsigned long integer, Type of device (i.e., SET, PKM, etc . . . ) |

-continued

| | | |
|---|---|---|
| devNumber: | 4 bytes, unsigned long integer, Number of device: Master, Slave01, Slave02, . . . | |
| ipAddress: | structure | |
| ip_addr | 4 bytes, unsigned long integer, IP Address of device, | |
| ip_port | 2 bytes, unsigned short integer, port number of protocol medium. | |

Device De-Registration Acknowledgment Message Sent from System

ProtoType=MITEL_INTERNAL

DevNum=N where N=0, 1, 2, . . . n msgType=DEVICE_DEREGISTRATION_ACK

DEVICE_UNREGISTER_ACK_MSG

| | |
|---|---|
| reqStatus: | 4 bytes, unsigned long integer, Success/Failure Result of the request |
| devNumber: | 4 bytes, unsigned long integer, Number of device: Master, Slave01, Slave02, . . . |

Detailed Description of Registration Parameters devType:

| | |
|---|---|
| INVALID_DEVICE_TYPE | 0x00000000 |
| IP_SUPERSET4001 | 0x00000001 |
| IP_SUPERSET4015 | 0x0000009f |
| IP_SUPERSET4025 | 0x000000a0 |
| IP_SUPERSET4150 | 0x00000004 |
| PKM | 0x00000005 |
| AIM | 0x00000006 |
| SYMBOL_PROXY | 0x00000007 |
| SYMBOL_SET | 0x00000008 |
| TELEWORKER_PROXY | 0x00000009 |
| TELEWORKER_SET | 0x0000000a |
| E2T_PROXY | 0x0000000b |
| MAX_DEVICE_TYPE | 0x0000000c | devNumbers:

MASTER_DEVICE 0x00000000

Where Set=0, and any attached devices will be numbered MASTER_DEVICE+n where n>=1 reqStatus (Success/failure codes):

| | |
|---|---|
| MTL_SUCCESS | 0x00000000 |
| MTL_FAILURE | 0x00000001 |
| MTL_NO_PERMISSIONS | 0x00000002 |
| MTL_NO_RESOURCES | 0x00000003 |
| MTL_INVALID_DEVICE | 0x00000004 |
| MTL_INVALID_REQUEST | 0x00000005 | devCodecs bitmap:

| | | |
|---|---|---|
| NO_CODEC_SUPPORT | 0x0 | (000 00000000) |
| G711_ULAW64 | 0x1 | (000 00000001) |
| G711_ALAW64 | 0x2 | (000 00000010) |
| G728 | 0x4 | (000 00000100) |
| G729 | 0x8 | (000 00001000) |
| G729_ANNEXB | 0x10 | (000 00010000) |
| G729_ANNEXA_w_ANNEXB | 0x20 | (000 00100000) |
| G723 | 0x40 | (000 01000000) |
| G7231_ANNEXC | 0x80 | (000 10000000) |
| Placeholder1 | 0x100 | (001 00000000) |
| Placeholder2 | 0x200 | (010 00000000) |
| Placeholder3 | 0x400 | (100 00000000) |
| INVALID_CODEC | 0x7FF | (111 11111111) |

For system maintenance purposes, it is desirable to provide a mechanism for testing the presence of an operating IP phone 1 in the system by generation of echo (PING) messages to the phone 1. The following messages are generated and exchanged between the IP phone and the PBX to implement this functionality:

Device ICMP Echo (Ping) Request to the Phone

ProtoType=MITEL_INTERNAL

DevNum=N where N=0, 1, 2, . . . n msgtype=DEVICE_PING

DEVICE_PING_REQUEST_MSG

| | |
|---|---|
| hostIpAddress: | structure |
| ip_addr | 4 bytes, unsigned long integer, IP Address of device to PING, |
| ip_port | 2 bytes, unsigned short integer, port number is IGNORED. Note that due to long word alignment, there may be two bytes of filler following this field. |
| numRequests | 4 bytes, unsigned long integer, Number of ping requests to send |
| pktSize | 4 bytes, unsigned long integer, Size of data packet to send (in bytes) |
| pktDelay | 4 bytes, unsigned long integer, Inter packet delay in Milliseconds |
| timeOut | 4 bytes, unsigned long integer, Ping request timeout in Milliseconds |
| qosLevel | 4 bytes, unsigned long integer, QOS level requested |

Device ICMP Echo (Ping) Results Sent from the Phone to the System

ProtoType=MITEL_INTERNAL

DevNum=N where N=0, 1, 2, . . . n msgType=DEVICE_PING_ACK

DEVICE_PING_ACK_MSG

| | |
|---|---|
| hostIpAddress: | structure |
| ip_addr | 4 bytes, unsigned long integer, IP Address of device that was PINGed, |
| ip_port | 2 bytes, unsigned short integer, port number is IGNORED. Note that due to long word alignment, there may be two bytes of filler following this field. |
| pktsSent | 4 bytes, unsigned long integer, Number of ICMP echo requests sent |
| pktsRecv | 4 bytes, unsigned long integer, Number of ICMP echo replys received |
| pktLoss | 4 bytes, unsigned long integer, Percentage of packets lost |
| rttMax | 4 bytes, unsigned long integer, Maximum round trip time (in milliseconds) |
| rttMin | 4 bytes, unsigned long integer, Minimum round trip time (in milliseconds) |
| rttAvg | 4 bytes, unsigned long integer, Average round trip time (in milliseconds) |

Detailed Description of PING Parameters qosLevel:

| | |
|---|---|
| QOS_LEVEL_NONE | 0xffffffff |
| QOS_LEVEL_0 | 0x00000000 |
| QOS_LEVEL_1 | 0x00000001 |
| QOS_LEVEL_2 | 0x00000002 |
| QOS_LEVEL_3 | 0x00000003 |
| QOS_LEVEL_4 | 0x00000004 |
| QOS_LEVEL_5 | 0x00000005 |
| QOS_LEVEL_6 | 0x00000006 |
| QOS_LEVEL_7 | 0x00000007 |

Once the IP phone 1 has been registered with PBX 3, and in response to a user going off-hook, the PBX 3 is required to provide tones to the phone in order to provide the user with an indication of the call state (e.g. dial tone, busy, etc.) The following messages are generated and exchanged between the IP phone and the PBX for providing device tones to the phone 1:

Apply Tone Device Tone Generation Request Message to the Phone:

ProtoType=MITEL_INTERNAL

DevNum=N where N=0, 1, 2, . . . n msgType=APPLY_TONE

| APPLY TONE REQUEST MSG | |
|---|---|
| sysToken: | 4 bytes, unsigned long integer, System defined "token" that must be passed back with the Remove Tone request. |
| sysStrmID: | 4 bytes, unsigned long integer, System provided stream ID which maps the voice streams to legacy B channels |
| tone[MAX_COMPLEX_TONE]: | array of tone structures of frequencies the DSP is to play |
| on_T1 | 2 bytes, unsigned long integer, Duration in ms of 1st ON period |
| off_T1 | 2 bytes, unsigned long integer, Duration in ms of 1st OFF period |
| on_T2 | 2 bytes, unsigned long integer, Duration in ms of 2nd ON period |
| off_T2 | 2 bytes, unsigned long integer, Duration in ms of 2nd OFF period |
| num_cycles | 2 bytes, unsigned long integer, Number of times to repeat the ON/OFF sequence |
| tail | 2 bytes, unsigned long integer, After num_cycles, 0 = leave tone off, 1 = on |
| freq_1 | 2 bytes, unsigned long integer, 1st frequency component in Hz |
| freq_2 | 2 bytes, unsigned long integer, 2nd frequency component in Hz |
| level_1 | 2 bytes, unsigned long integer, 1st frequency signal level |
| level_2 | 2 bytes, unsigned long integer, 2nd frequency signal level |
| action | 2 bytes, unsigned long integer, indicates the action to take on completion of the tone. The actions are either to continue to the non tone descriptor, reconnect to the audio stream, or just stop. Note that due to long word alignment. there may be 2 bytes of filler following this field. |
| toneID: | 4 bytes, unsigned long integer. System Tone ID of the tone being applied |
| inject; | 4 bytes, unsigned long integer, specify whether to inject the tone on top of voice or not. This is unused by the phone since the tone will always take precedence over voice. |

Remove Tone Device Tone Generation Request Message to the Phone

ProtoType=MITEL_INTERNAL

DevNum=N where N=0, 1, 2, . . . n msgType=REMOVE_TONE

REMOVE_TONE_REQUEST_MSG

| | |
|---|---|
| sysToken: | 4 bytes, unsigned long integer, System defined "token" that was given with the Apply Tone request. |
| sysStrmID: | 4 bytes, unsigned long integer, System provided stream ID which maps the voice streams to legacy B channels |
| tone[MAX_COMPLEX_TONE]: | array of tone structures of frequencies the DSP was playing out to the CODEC that it is to remove. Note that this is IGNORED BY IP PHONE |
| on_T1 | 2 bytes, unsigned long integer, Duration in ms of 1st ON period |
| off_T1 | 2 bytes, unsigned long integer, Duration in ms of 1st OFF period |
| on_T2 | 2 bytes, unsigned long integer, Duration in ms of 2nd ON period |
| off_T2 | 2 bytes, unsigned long integer, Duration in ms of 2nd OFF period |
| num_cycles | 2 bytes, unsigned long integer, Number of times to repeat the ON/OFF sequence |
| tail | 2 bytes, unsigned long integer, After num_cycles, 0 = leave tone off, 1 = on |
| freq_1 | 2 bytes, unsigned long integer, 1st frequency component in Hz |
| freq_2 | 2 bytes, unsigned long integer, 2nd frequency component in Hz |
| level_1 | 2 bytes, unsigned long integer, 1st frequency signal level |
| level_2 | 2 bytes, unsigned long integer, 2nd frequency signal level |
| action | 2 bytes, unsigned long integer, indicates the action to take on completion of the tone. The actions are either to continue to the next tone descriptor, reconnect to the audio stream, or just stop. |

Detailed Description of TONE Parameters inject:

| inject: | |
|---|---|
| NOT_INJECTED | 0x00000000 |
| NORMAL_INJECTION | 0x00000001 |
| MAX_TONE_INJECT | 0x00000002 |
| MAX_COMPLEX_TONE | 3 |
| action: | |
| NEXT | 0x00000000 |
| RECONNECT | 0x00000001 |
| STOP | 0x00000002 |

Figure 2:
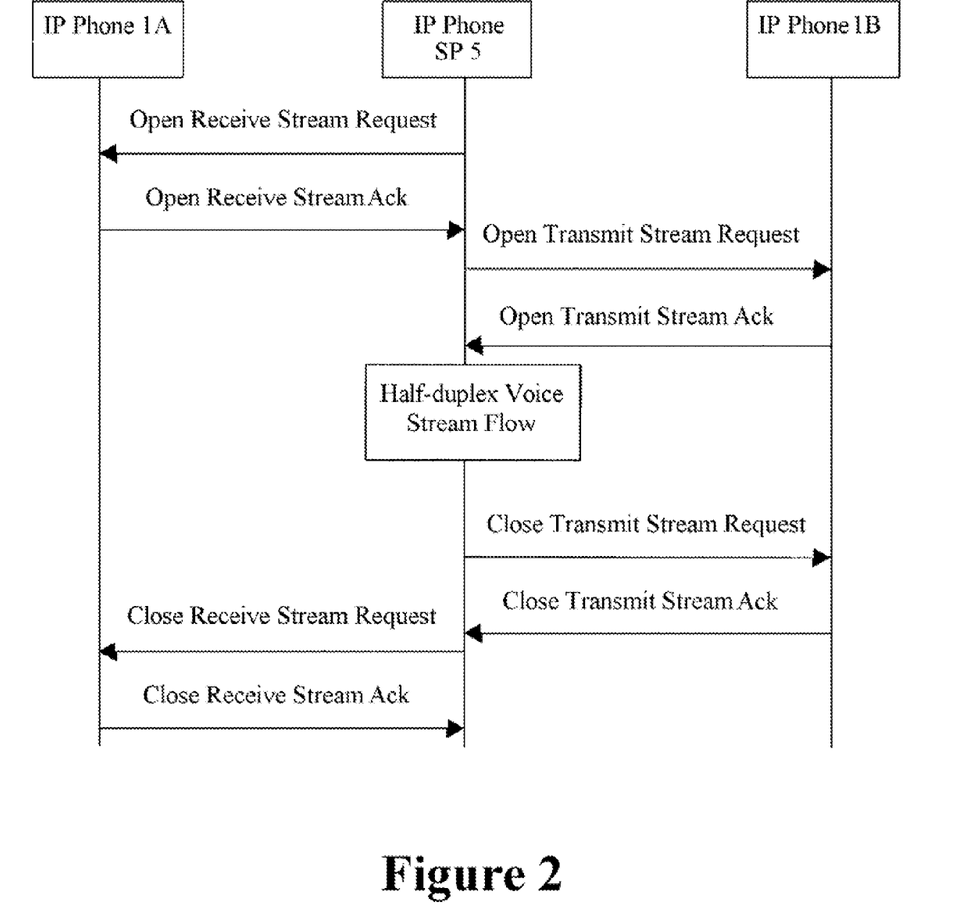
FIG. 2 is a message flow diagram showing the establishment of a full duplex voice path between a pair of IP phones.

FIG. 2 is a message flow diagram showing the messages required to establish communications between a pair of IP phones 1A and 1B via an IP Phone Service Provider 5 of PBX 3. The following messages are generated and exchanged between the IP phones and the PBX to implement such communications:

Open Receive Stream Request to the Phone:

ProtoType=MITEL_INTERNAL

DevNum=N where N=0, 1, 2, . . . n msgType=OPEN_RX_STREAM

| OPEN RX STREAM REQUEST MSG | |
|---|---|
| sysToken: | 4 bytes, unsigned long integer, System defined "token" that must be passed back with the corresponding Close Receive Stream Request. |
| sysStrmID: | 4 bytes, unsigned long integer, System provided stream ID. This field denotes the B channel the connection should assume. |
| strmCodec | 4 bytes, unsigned long integer (bitmap), System selected CODEC to use. Multiple CODECs may be logically Ored into this field. |
| strmFrameSizeInMS | 4 bytes, unsigned long integer, Preferred CODEC frame size for the RX stream (in milliseconds) |
| isMulticast | 4 bytes, unsigned long integer isMulticast=0: no Multicast, ignore mclpAddress. isMulticast=1: the stream must be bound to the mcIpAddress Multicast address. |
| mcIpAddress: | structure |
| ip_addr | 4 bytes, unsigned long integer, Multicast address to receive on |
| ip_port | 2 bytes, unsigned short integer, Multicast port number to receive on. Note that due to long word alignment, there may be two bytes of filler following this field |
| SrcIpAddress: | strucure: IGNORED BY THE IP PHONE |
| ip_addr | 4 bytes. unsigned long integer, The ip address of the device that will be transmitting to the phone. |
| ip_port | 2 bytes, unsigned short integer, port number used by the device that will be transmitting to the phone. Note that due to long word alignment, there may be two bytes of filler following this field. |
| noSilence | 4 bytes, unsigned long integer, noSilence=0: no silence suppression applied by the transmitting end noSilence=1: silence suppression is being applied by the transmitting end |

Open Receive Stream Acknowledgement from the IP Phone to the System:

ProtoType=MITEL_INTERNAL

DevNum=N where N=0, 1, 2, . . . n msgType=OPEN_RX_STREAM_ACK

OPEN_RX_STREAM_ACK_MSG

| reqStatus: | 4 bytes, unsigned long integer, Success/Failure Result of the request |
|---|---|
| sysToken: | 4 bytes, unsigned long integer, System provided "token" from the request message |
| rxConnectionID: | 4 bytes, unsigned long integer, Device selected stream/connection identifier. The IP Phone returns the value of the sysStrmID (B channel) in this field |
| rxStrmIpAddress: | structure |
| ip_addr | 4 bytes, unsigned long integer, The local ip address that will receive stream |
| ip_port | 2 bytes, unsigned short integer, local port number to receive on. |

Close Receive Stream Request from the System to the IP Phone:

ProtoType=MITEL_INTERNAL

DevNum=N where N=0, 1, 2, . . . n msgType=CLOSE_RX_STREAM

CLOSE_RX_STREAM_REQUEST_MSG

| sysToken: | 4 bytes, unsigned long integer, System defined "token" that was given with the Open Receive Stream Request. |
|---|---|
| sysStrmID: | 4 bytes, unsigned long integer, Id of RX stream/connection (B channel) to close |

Close Receive Stream Acknowledgement from the IP Phone:

ProtoType=MITEL_INTERNAL

DevNum=N where N=0, 1, 2, . . . n msgType=CLOSE_RX_STREAM_ACK

CLOSE_RX_STREAM_ACK_MSG

| reqStatus: | 4 bytes, unsigned long integer, Success/Failure Result of the request |
|---|---|
| sysToken: | 4 bytes, unsigned long integer, System provided "token" from the request message |
| rxStrmStats: | structure: Stream statistics upon closure |
| Packets.recv | 4 bytes, unsigned long integer, number of RTP packets received |
| Bytes.recv | 4 bytes, unsigned long integer, number of voice octets received |
| Errors.rxStream | 4 bytes, unsigned long integer, number of RTP errors received |
| Jitter.rxStream | 4 bytes, unsigned long integer, estimate of average jitter over duration of call |
| Duration.rxStream | 4 bytes, unsigned long integer, duration of call in seconds |
| IpAddress.src: | structure |
| ip_addr | 4 bytes, unsigned long integer, the local ip address |
| ip_port | 2 bytes, unsigned short integer, the local port number. |

Open Transmit Stream Request to the IP Phone:

ProtoType=MITEL_INTERNAL

DevNum=N where N=0, 1, 2, . . . n msgType=OPEN_TX_STREAM

OPEN_TX_STREAM_REQUEST_MSG

| | |
|---|---|
| sysToken: | 4 bytes, unsigned long integer, System defined "token" that must be passed back with the corresponding Close Transmit Stream Request. |
| sysStrmID: | 4 bytes, unsigned long integer, System provided stream ID. This field denotes the B channel the connection should assume. |
| strmCodec | 4 bytes, unsigned long integer (bitmap), System selected CODEC to use. Multiple CODECs may be logically Ored into this field. |
| strmFrameSizeInMS | 4 bytes, unsigned long integer, Preferred CODEC frame size for the TX stream (in milliseconds) |
| destStrmIpAddress: | structure |
| ip_addr | 4 bytes, unsigned long integer, The IP address of the device to transmit to. |
| ip_port | 2 bytes, unsigned short integer, port number used by the device that will be transmitting to the phone. Note that due to long word alignment, there may be two bytes of filler following this field. |
| qosLevel | 4 bytes, unsigned long integer, QoS level requested. If 0xffffffff, then no 802.1Q tag, else if 0-7, assume 802.1Q tag and set priority field to the qosLevel |
| noSilence | 4 bytes, unsigned long integer noSilence =0: disable silence suppression on the Tx stream noSilence =1: enable silence suppression on the Tx stream |

Open Transmit Stream Acknowledgement from the IP Phone:

ProtoType=MITEL_INTERNAL

DevNum=N where N=0, 1, 2, ... n msgType=OPEN_TX_STREAM_ACK

OPEN_TX_STREAM_ACK_MSG

| | |
|---|---|
| reqStatus: | 4 bytes, unsigned long integer, Success/Failure Result of the request |
| sysToken: | 4 bytes, unsigned long integer, System provided "token" from the request message |
| txConnectionID: | 4 bytes, unsigned long integer, Device selected stream/connection identifier. The IP Phone returns the value of the sysStrmID (B channel) in this field |
| txStrmIpAddress: | structure |
| ip_addr | 4 bytes, unsigned long integer, The local IP address that will transmit stream |
| ip_port | 2 bytes, unsigned short integer, local port number the phone will transmit from. |

Close Transmit Stream Request to the IP Phone

ProtoType=MITEL_INTERNAL

DevNum=N where N=0, 1, 2, ... n msgType=CLOSE_TX_STREAM

CLOSE_TX_STREAM_REQUEST_MSG

| | |
|---|---|
| sysToken: | 4 bytes, unsigned long integer, System defined "token" that was given with the Open Transmit Stream Request. |
| sysStrmID: | 4 bytes, unsigned long integer, Id of TX stream/connection (B channel) to close |

Close Transmit Stream Acknowledgement from the IP Phone:

ProtoType=MITEL_INTERNAL

DevNum=N where N=0, 1, 2, ... n msgType=CLOSE_TX_STREAM_ACK

CLOSE_TX_STREAM_ACK_MSG

| | |
|---|---|
| reqStatus: | 4 bytes, unsigned long integer, Success/Failure Result of the request |
| sysToken: | 4 bytes, unsigned long integer, System provided "token" from the request message |
| txStrmStats: | structure: Stream statistics upon closure |
| Packets.sent | 4 bytes, unsigned long integer, number of RTP packets sent |
| Bytes.sent | 4 bytes, unsigned long integer, number of voice octets sent |
| Errors.txStream | 4 bytes, unsigned long integer, number of RTP errors sent. IGNORE, NOT RELEVENT |
| Jitter.txStream | 4 bytes, unsigned long integer, estimate of average jitter over duration of call IGNORE, NOT RELEVENT |
| Duration.txStream | 4 bytes, unsigned long integer, duration of call in seconds |
| IpAddress.dest | structure |
| ip_addr | 4 bytes, unsigned long integer, the local IP address used to Tx |
| ip_port | 2 bytes, unsigned short integer, the local port number used to Tx. |

Detailed Description of Connection Parameters reqStatus (Success/failure codes):

| | |
|---|---|
| MTL_SUCCESS | 0x00000000 |
| MTL_FAILURE | 0x00000001 |
| MTL_NO_PERMISSIONS | 0x00000002 |
| MTL_NO_RESOURCES | 0x00000003 |
| MTL_INVALID_DEVICE | 0x00000004 |
| MTL_INVALID_REQUEST | 0x00000005 |

SysStrmID:

IP Set Stream IDs: (NOTE: TX is always even) used for sysStrmID of TX & Rx connect requests

| | |
|---|---|
| STREAM_ID_IP_SET_TX_1 | 0x00000000 // B1 TX |
| STREAM_ID_IP_SET_RX_1 | 0x00000001 // B1 RX |
| STREAM_ID_IP_SET_TX_2 | 0x00000002 // B2 TX |
| STREAM_ID_IP_SET_RX_2 | 0x00000003 // B2 RX | devCodecs bitmap:

| NO_CODEC_SUPPORT | 0x0 | (000 00000000) |
| --- | --- | --- |
| G711_ULAW64 | 0x1 | (000 00000001) |
| G711_ALAW64 | 0x2 | (000 00000010) |
| G728 | 0x4 | (000 00000100) |
| G729 | 0x8 | (000 00001000) |
| G729_ANNEXB | 0x10 | (000 00010000) |
| G729_ANNEXA_w_ANNEXB | 0x20 | (000 00100000) |
| G723 | 0x40 | (000 01000000) |
| G7231_ANNEXC | 0x80 | (000 10000000) |
| Placeholder1 | 0x100 | (001 00000000) |
| Placeholder2 | 0x200 | (010 00000000) |
| Placeholder3 | 0x400 | (100 00000000) |
| INVALID_CODEC | 0x7FF | (111 11111111) | qosLevel:

| QOS_LEVEL_NONE | 0xffffffff |
| --- | --- |
| QOS_LEVEL_0 | 0x00000000 |
| QOS_LEVEL_1 | 0x00000001 |
| QOS_LEVEL_2 | 0x00000002 |
| QOS_LEVEL_3 | 0x00000003 |
| QOS_LEVEL_4 | 0x00000004 |
| QOS_LEVEL_5 | 0x00000005 |
| QOS_LEVEL_6 | 0x00000006 |
| QOS_LEVEL_7 | 0x00000007 |

One important system administration requirement for IP phone systems is to provide a mechanism for updating the IP address for a device (e.g. an IP phone) connected to the Ethernet PBX 3. The following messages are generated and exchanged between the IP phone and the PBX to implement this functionality:

Device IP Address Update Request to the Phone:

ProtoType=MITEL_INTERNAL

DevNum=N where N=0, 1, 2, . . . n msgType=DEVICE_IP_UPDATE

DEVICE_IP_UPDATE_REQUEST_MSG

| devNumber | 4 bytes, unsigned long integer, Number at device: Master, Slave01, Slave02, . . . |
| --- | --- |
| oldIpAddress: | structure |
| ip_addr | 4 bytes, unsigned long integer, old IP Address of device |
| ip_port | 2 bytes, unsigned short integer, old port number of device Note that due to long word alignment, there may be two bytes of filler following this field. |
| newIpAddress: | structure |
| ip_addr | 4 bytes, unsigned long integer, new IP Address of device |
| ip_port | 2 bytes, unsigned short integer, new port number of device |

Device IP Address Update Acknowledgement from the Phone:

ProtoType=MITEL_INTERNAL

DevNum=N where N=0, 1, 2, . . . n msgType=DEVICE_IP_UPDATE_ACK

DEVICE_IP_UPDATE_ACK_MSG reqStatus: 4 bytes, unsigned long integer, Success/Failure Result of the request Parameters Description reqStatus (Success/failure codes):

| MTL_SUCCESS | 0x00000000 |
| --- | --- |
| MTL_FAILURE | 0x00000001 |
| MTL_NO_PERMISSIONS | 0x00000002 |
| MTL_NO_RESOURCES | 0x00000003 |
| MTL_INVALID_DEVICE | 0x00000004 |
| MTL_INVALID_REQUEST | 0x00000005 | devNumbers:

MASTER_DEVICE 0x00000000

Where Set=0, and any attached devices will be numbered MASTER_DEVICE+n where n>=1

Finally, as indicated above, the messaging protocol of the present invention allows for the encapsulation of "legacy" Minet messages (i.e. MTS 22 messages) to and from the IP phones. The following message format is used:

Wrapper Structure for MINET Messages to and from the IP Phone:

ProtoType=MINET_MTS22

DevNum=N where N=0, 1, 2, . . . n msgType=MINET_WRAPPER

MINET_WRAPPER_MSG

| msgLen: | 4 bytes, unsigned long integer, length of the following MINET message. |
| --- | --- |
| msg[MAX_MINET_SIZE] | array unsigned char, the MTS22 MINET message |

Parameters Description

MAX_MINET_SIZE 160

In summary, according to the present invention, a method of controlling telephone connections for internet protocol communications comprises providing a messaging protocol for wrapping or encapsulating messages exchanged between an IP phone and a PBX, the message protocol using a general message template having a Protocol Header and an IP Message body, along with a collection of messages which conform to the protocol, for controlling IP phones within an Ethernet-based PBX system. The invention has particular applicability as a message interface method for use in communication from Mitel's IP Phones to Mitel's IP enabled PBXs. The message interface method is compatible with an H323 Voice Gateway implementation.

Alternatives and variations of the invention are possible. For example, the protocol can be adapted to control voice/data switching on any IP centric node. In other words, the protocol is not constrained to phones but, rather, can be applied to any internet appliance that is a client to the IP centric PBX. Within the PBX, the protocol can be used by call control in order to control the switching fabric. All such embodiments, modifications and applications are believed to be within the sphere and scope of the invention as defined by the claims appended hereto.

I claim:

1. A method of communication between an IP phone and a network-implemented PBX comprising:
    generating a message to be exchanged between said IP phone and said PBX;
    encapsulating said message with a Protocol Header and an IP Message body, wherein the Protocol Header includes a Protocol Type indicator denoting whether the message is an IP message or an encapsulated non-IP message, a Device Number for denoting by means of MAC (Media Access Control) an address within said PBX to which said message is to be transmitted or from which said message is to be received, and Message Type for identifying the type of message contained in the IP Message Body; and,
    transmitting the encapsulated message between said network implemented PBX and said IP phone, the Protocol Type indicator enabling at least one task between said IP phone and said PBX selected from the group consisting of registering said IP phone with the PBX upon phone power up or reset, applying device tones to said IP phone controlling connection between said IP phone and another phone to establish full-duplex voice paths therebetween, and providing PBX based administrative and telephony functions to said IP phone.

2. The method of claim 1, wherein said message is a Device Registration request, and further comprising transmitting the Device Registration request from said IP Phone to said PBX responsive to one of either a power-up or a resetting of said IP phone.

3. The method of claim 2, further comprising generating, encapsulating and transmitting a Device Registration request Acknowledgment message from said PBX to said IP phone.

4. The method of claim 3, further comprising generating, encapsulating and transmitting a Device De-Registration Request message from said IP phone to said PBX.

5. The method of claim 4, further comprising generating, encapsulating and transmitting a Device De-Registration Acknowledgment message from said PBX to said IP phone.

6. The method of claim 1, wherein said message is a Device ICMP Echo (ping) request, and further comprising transmitting the Device ICMP Echo (ping) request from said PBX to said to said IP Phone for testing for the presence of said IP phone.

7. The method of claim 6, further comprising generating, encapsulating and transmitting a device ICMP Echo (Ping) results message from said IP phone to the PBX.

8. The method of claim 3, further comprising generating, encapsulating and transmitting a device tone generation request message from said PBX to said IP phone responsive to registration of said IP phone with said PBX and said IP phone going off-hook.

9. The method of claim 8, further comprising generating, encapsulating and transmitting a Remove Tone device tone generation request message from said PBX to said IP phone.

10. The method of claim 9, further comprising generating, encapsulating and transmitting an Open Receive Stream Request from said PBX to said IP phone for establishing an audio path from said PBX to said IP phone.

11. The method of claim 10, further comprising generating, encapsulating and transmitting an Open Receive Stream Acknowledgement from said IP Phone to said PBX.

12. The method of claim 11, further comprising generating, encapsulating and transmitting a Close Receive Stream Request from the PBX to the IP Phone.

13. The method of claim 12, further comprising generating, encapsulating and transmitting a Close Receive Stream Acknowledgement from the IP Phone to the PBX.

14. The method of claim 12, further comprising generating, encapsulating and transmitting an Open Transmit Stream Request from said PBX to said IP phone for establishing an audio path from said IP phone to said PBX.

15. The method of claim 14, further comprising generating, encapsulating and transmitting an Open Transmit Stream Acknowledgement from the IP Phone to said PBX.

16. The method of claim 15, further comprising generating, encapsulating and transmitting a Close Transmit Stream Request from the PBX to the IP phone.

17. The method of claim 16, further comprising generating, encapsulating and transmitting a Close Transmit Stream Acknowledgement from the IP phone to the PBX.

18. The method of claim 1, wherein said message is a Device IP address update request message, and further comprising transmitting the Device IP address request from said PBX to said IP phone for initiating update of any change in IP address of said IP phone.

19. The method of claim 18, further comprising generating, encapsulating and transmitting a Device IP address update acknowledgement from the IP phone to said PBX.

20. The method of claim 1, wherein said message is a legacy call control message.

* * * * *